(12) United States Patent
Matsuda et al.

(10) Patent No.: US 9,464,221 B2
(45) Date of Patent: Oct. 11, 2016

(54) ALUMINA SINTERED BODY AND METHOD FOR PRODUCING SAME

(71) Applicant: atect corporation, Osaka (JP)

(72) Inventors: Hiroshi Matsuda, Osaka (JP); Yoshitaka Fukushima, Osaka (JP); Yohei Sone, Osaka (JP); Hirotada Tanimoto, Osaka (JP); Yusuke Tanaka, Osaka (JP); Keiichi Kagawa, Osaka (JP); Norio Kotaka, Osaka (JP)

(73) Assignee: Atect Corporation, Osaka (JP)

( * ) Notice: Subject to any disclaimer, the term of this patent is extended or adjusted under 35 U.S.C. 154(b) by 0 days.

(21) Appl. No.: 14/621,448

(22) Filed: Feb. 13, 2015

(65) Prior Publication Data

US 2015/0232733 A1    Aug. 20, 2015

(30) Foreign Application Priority Data

Feb. 14, 2014  (JP) ................. 2014-027020

(51) Int. Cl.
| | | |
|---|---|---|
| *C04B 35/117* | (2006.01) | |
| *C04B 35/582* | (2006.01) | |
| *C09K 5/14* | (2006.01) | |
| *C04B 35/10* | (2006.01) | |

(52) U.S. Cl.
CPC ............. *C09K 5/14* (2013.01); *C04B 35/10* (2013.01); *C04B 35/117* (2013.01); *C04B 2235/3208* (2013.01); *C04B 2235/3217* (2013.01); *C04B 2235/3222* (2013.01); *C04B 2235/3225* (2013.01); *C04B 2235/3409* (2013.01); *C04B 2235/3865* (2013.01); *C04B 2235/449* (2013.01); *C04B 2235/5436* (2013.01); *C04B 2235/5445* (2013.01); *C04B 2235/652* (2013.01); *C04B 2235/6567* (2013.01); *C04B 2235/721* (2013.01); *C04B 2235/77* (2013.01); *C04B 2235/96* (2013.01); *C04B 2235/9607* (2013.01); *C04B 2235/9692* (2013.01)

(58) Field of Classification Search
CPC ........................ C04B 35/117; C04B 35/581
See application file for complete search history.

(56) References Cited

U.S. PATENT DOCUMENTS

| | | | | |
|---|---|---|---|---|
| 4,956,318 A | * | 9/1990 | Moskowitz | C04B 35/111 407/119 |
| 8,541,328 B2 | * | 9/2013 | Watanabe | C04B 35/581 501/96.1 |
| 8,597,776 B2 | * | 12/2013 | Watanabe | C04B 35/581 204/298.13 |

FOREIGN PATENT DOCUMENTS

| | | | |
|---|---|---|---|
| JP | 01100007 | * | 4/1989 |
| TW | 200619169 | * | 6/2006 |

OTHER PUBLICATIONS

Ando, Kotoji, et al., Fatigue Strength of an Al2O3/SiC Composite and a Monolithic Al2O3 Subjected to Crack-Healing Treatment, J. Soc. Mat. Sci., Japan, vol. 52, No. 12, pp. 1464-1470, Dec. 2003.

* cited by examiner

*Primary Examiner* — Karl Group
(74) *Attorney, Agent, or Firm* — McDonald Hopkins, LLC

(57) ABSTRACT

Provided is an alumina sintered body which has a high heat conductivity and a high infrared ray emissivity and is excellent in electrical insulation property and chemical resistance.
An alumina sintered body contains cubic aluminum nitride.

3 Claims, No Drawings

ALUMINA SINTERED BODY AND METHOD FOR PRODUCING SAME

CROSS-REFERENCE TO RELATED APPLICATION

This application claims priority to Japanese Patent Application No. 2014-027020, filed on Feb. 14, 2014, which is incorporated herein in its entirety by reference.

BACKGROUND OF THE INVENTION

1. Field of the Invention

The present invention relates to an alumina sintered body and a method for producing the alumina sintered body.

2. Description of the Related Art

A computer, or an automatic control unit of an automobile or the like is equipped with a heat dissipation part for suppressing deterioration of performance due to an increase in heat generation amount which is associated with a large current. In recent years, a heat dissipation sintered substrate made of ceramic has received attention as a heat dissipation part in view of improving heat dissipation performance, productivity, production cost performance and so on.

Such a heat dissipation sintered substrate made of ceramic is required to have not only basic properties such as an electrical insulation property, but also a high heat conductivity and a high infrared ray emissivity from the viewpoint of heat dissipation. As a material of the heat dissipation sintered substrate, for example, aluminum nitride (AlN) has been heretofore used. However, the AlN heat dissipation substrate is significantly poor in water resistance, particularly chemical resistance to an alkali aqueous solution, and therefore has the problem that mounting of a circuit on the substrate is technically difficult. For example, the AlN heat dissipation substrate is required to be subjected to a surface treatment for imparting high chemical resistance by purposely oxidizing the surface layer to a depth of approximately several hundreds μm, so that production costs are increased.

Thus, a ceramic material to replace aluminum nitride, which has high chemical resistance while having a high insulation property, a high heat conductivity and a high infrared ray emissivity, is desired. Many of ceramic materials are prepared through a so called "sintering" process in which a raw material powder is fired to be solidified, and one of typical sintered bodies is an alumina sintered body. The alumina sintered body has a high insulation property and is excellent in chemical resistance.

It is known that properties which could not be exhibited by an alumina sintered body alone can be imparted to the alumina sintered body by selecting an additive to be used during sintering. For example, in Ando et al., "Material No. 52", pages 1464 to 1470, published in 2003, it is reported that when silicon carbide is used as a sintering additive with alumina ($Al_2O_3$) used as a base material, a sintered body having a mechanical strength that is three times as high as that of conventional alumina alone is obtained.

However, an alumina sintered body that has been heretofore known is excellent in electrical insulation property and chemical resistance, but has a low heat conductivity and infrared ray emissivity. It is difficult to apply an alumina sintered body, which has a low heat conductivity and infrared ray emissivity, to a substrate of a heat dissipation part.

A ceramic material which has a high heat conductivity and a high infrared ray emissivity and is excellent in electrical insulation property and chemical resistance is desired as mentioned above, but one that satisfies all these properties and can be suitably used as a substrate of a heat dissipation part has not been found yet.

Under the above-mentioned circumstances, a main object of the present invention is to provide an alumina sintered body which has a high heat conductivity and a high infrared ray emissivity and is excellent in electrical insulation property and chemical resistance.

SUMMARY OF THE INVENTION

The present inventor has extensively conducted studies for solving the problems described above. As a result, the present inventor has found that an alumina sintered body containing cubic aluminum nitride has a high heat conductivity and a high infrared ray emissivity and is excellent in electrical insulation property and chemical resistance. Further, the present inventor has found that the alumina sintered body having the above-mentioned excellent properties can be produced by a convenient method in which an alumina powder having a specific particle size is sintered under a reducing nitrogen atmosphere. The present invention is an invention that has been completed by further conducting studies based on the above-mentioned findings.

That is, the present invention provides an invention having the aspects described below.

Item 1. An alumina sintered body containing cubic aluminum nitride.

Item 2. The alumina sintered body according to item 1, wherein the heat conductivity is 35 W/m·K or more.

Item 3. The alumina sintered body according to item 1 or 2, wherein the infrared ray emissivity is 0.60 or more.

Item 4. A method for producing an alumina sintered body containing cubic aluminum nitride, the method including a sintering step of firing an alumina powder having an average particle size of 10 μm or less under a reducing nitrogen atmosphere.

Item 5. The method for producing an alumina sintered body according to item 4, wherein the alumina powder having an average particle size of 10 μm or less is fired together with an organic binder.

Item 6. The method for producing an alumina sintered body according to item 4 or 5, wherein the alumina powder having an average particle size of 10 μm or less is fired together with a sintering aid.

Item 7. The method for producing an alumina sintered body according to any one of items 4 to 6, wherein the firing temperature in the sintering step is in a range of 1600 to 1825° C.

Item 8. The method for producing an alumina sintered body according to any one of items 4 to 7, wherein in the sintering step, the alumina powder having an average particle size of 10 μm or less is fired under an atmosphere of at least one of nitrogen and ammonia.

According to the present invention, there can be provided an alumina sintered body which has a high heat conductivity and a high infrared ray emissivity and is excellent in electrical insulation property and chemical resistance. The alumina sintered body of the present invention can be suitably used as an insulating substrate, a substrate of a heat dissipation part, a semiconductor package material or the like. Further, according to the present invention, there can be provided a production method by which an alumina sintered body having the above-mentioned excellent properties are conveniently obtained.

DETAILED DESCRIPTION OF THE INVENTION

An alumina sintered body of the present invention contains cubic aluminum nitride. A method for producing an alumina sintered body according to the present invention includes a sintering step of firing an alumina powder having an average particle size of 10 μm or less under a reducing nitrogen atmosphere. The alumina sintered body and the method for producing the alumina sintered body according to the present invention will be described in detail below.

Alumina Sintered Body

The alumina sintered body of the present invention contains cubic aluminum nitride (cAlN). More specifically, the alumina sintered body of the present invention has a structure in which cubic aluminum nitride is dispersed in a matrix of alumina ($Al_2O_3$). Consequently, the aluminum sintered body of the present invention has a high heat conductivity and a high infrared ray emissivity and is excellent in electrical insulation property and chemical resistance. That is, since cubic aluminum nitride having a high heat conductivity is dispersed in a matrix of alumina, the heat conductivity and the infrared ray emissivity are increased as compared to conventional alumina sintered bodies. The alumina sintered body includes cubic aluminum nitride that generally has a sphalerite type structure.

The content of cubic aluminum nitride in the alumina sintered body of the present invention is not particularly limited, but is preferably about 0.3 to 3.0% by volume, more preferably about 0.4 to 2.5% by volume, further preferably about 0.5 to 2.0% by volume for ensuring that the aluminum sintered body is excellent in electrical insulation property and chemical resistance while having an increased heat conductivity and infrared ray emissivity.

The alumina sintered body of the present invention may contain aluminum oxynitride (AlNO). Aluminum oxynitride has a heat conductivity higher than that of alumina, and therefore when aluminum oxynitride is contained in a matrix of alumina, the heat conductivity and the infrared ray emissivity can be increased as compared to conventional alumina sintered bodies. The content of aluminum oxynitride in the alumina sintered body of the present invention is not particularly limited, but is preferably about 0.5 to 10.0% by volume, more preferably about 0.5 to 9.0% by volume, further preferably about 0.5 to 8.0% by volume for ensuring that the aluminum sintered body is excellent in electrical insulation property and chemical resistance while having an increased heat conductivity and infrared ray emissivity.

The content of a phase formed of a component other than alumina, such as aluminum nitride or aluminum oxynitride, in the alumina sintered body of the present invention is a value measured by X-ray powder diffractometry using an X-ray powder diffractometer "SmartLab" manufactured by Rigaku Corporation. The content (volume percentage) of a phase formed of a component other than alumina is value calculated from an intensity ratio of the strongest peak of each phase to the (113) diffraction peak intensity of alumina.

As described later, in the method for producing an alumina sintered body according to the present invention, an organic binder, a sintering aid or the like may be blended in addition to a alumina powder as a raw material to be provided for sintering. Accordingly, the alumina sintered body of the present invention may contain components derived from an organic binder, a sintering aid and no on in addition to alumina, aluminum nitride and aluminum oxynitride.

The component derived from an organic binder in the alumina sintered body of the present invention is, for example, carbon. The content of carbon in the alumina sintered body of the present invention is not particularly limited, but is preferably 150 ppm or less, more preferably less than 100 ppm. The content of carbon in the alumina sintered body is a value measured in accordance with JIS-R1675 using an in-solid carbon analyzer "EMIA-110" manufactured by HORIBA, Ltd.

The component derived from a sintering aid in the alumina sintered body of the present invention varies depending on a type of sintering aid, and the alumina sintered body contain an inorganic component that is not vaporized by sintering. For example, when yttrium oxide is used as a sintering aid, YAG ($Y_3Al_5O_{12}$) or the like may be contained. The content of a component derived from a sintering aid in the alumina sintered body of the present invention varies depending on a type of sintering aid etc., but is normally about 0.5 to 10.0% by volume, preferably about 0.5 to 8.0% by volume, more preferably about 0.5 to 7.5% by volume. The method for measuring the content of a component derived from a sintering aid in the alumina sintered body is similar to the method for measuring the content of a phase formed of a component other than alumina.

The heat conductivity of the alumina sintered body of the present invention is preferably 35 W/m·K or more, more preferably 41 W/m·K or more. Thus, the alumina sintered body of the present invention has a very high heat conductivity as an alumina sintered body. The heat conductivity of the alumina sintered body of the present invention is normally 100 W/m·K or less. In the present invention, the heat conductivity of the alumina sintered body is a value measured at room temperature (25° C.) by a laser flash method using "TC-7000" manufactured by ULVAC-RIKO, Inc.

The infrared ray emissivity of the alumina sintered body of the present invention is preferably 0.60 or more. The infrared ray emissivity of the alumina sintered body of the present invention is normally 0.95 or less. In the present invention, the infrared ray emissivity of the alumina sintered body is a value measured at room temperature (25° C.) in accordance with DS-R|0932 using a Fourier transform infrared spectrophotometer "FT-IR System 2000" manufactured by PerkinElmer Co., Ltd.

The volume resistivity of the alumina sintered body of the present invention is normally more than $10^{14}$ Ωcm. When the volume resistivity is more than $10^{14}$ Ωcm, the alumina sintered body can be suitably used as a heat dissipation member, of a computer, or an automatic control unit of an automobile or the like because the electrical insulation property is sufficiently high. The volume resistivity of the alumina sintered body is a value measured at room temperature (25° C.) in accordance with JIS-K6911 using "HIGHRESTER" manufactured by Mitsubishi Chemical Corporation.

The flexural strength of the alumina sintered body of the present invention is preferably 300 MPa or more. When the flexural strength is 300 MPa or more, the alumina sintered body can be suitably used as a heat dissipation member of a computer, or an automatic control unit of an automobile or the like because the alumina sintered body has a sufficient strength. The flexural strength of the alumina sintered body of the present invention is normally 440 MPa or less. The flexural strength of the alumina sintered body is a value determined by measuring a three-point flexural strength at room temperature (25° C.) in accordance with JIS-R1601 using "AUTOGRAPH AG-20kNG" manufactured by Shimadzu Corporation.

The alumina sintered body of the present invention has excellent chemical resistance to acid and alkali. For example, the alumina sintered body of the present invention has a mass-decreasing rate of less than 0.1% by mass when for example, an alumina sintered body test piece (surface area: 5.3 cm$^2$) is immersed in a 6 N aqueous NaOH solution at 100° C. for 16 hours. For example, the alumina sintered body has a mass-decreasing rate of less than 0.01% by mass when an alumina sintered body test piece (surface area: 5.3 cm$^2$) is immersed in a 1 N aqueous H$_2$SO$_4$ solution at 100° C. for 16 hours. Since the alumina sintered body of the present invention has excellent chemical resistance to acid and alkali, a circuit is more easily mounted as compared to aluminum nitride.

The density of the alumina sintered body of the present invention is not particularly limited, but is normally about 3.80 to 4.00 g/cm$^2$, preferably about 3.85 to 3.98 g/cm$^2$.

The alumina sintered body of the present invention can be suitably used as an insulating substrate, a substrate of a heat dissipation part, a semiconductor package material or the like because the alumina sintered body has a high heat conductivity and a high infrared ray emissivity and is excellent in electrical insulation property and chemical resistance.

Method for Producing Alumina Sintered Body

The method for producing an alumina sintered body according to the present invention is not particularly limited, but the alumina sintered body can be conveniently produced by, for example, a method including a sintering step of firing an alumina powder having an average particle size of 10 μm or less under a reducing nitrogen atmosphere.

The average particle size of an alumina powder to be used as a raw material of the alumina sintered body of the present invention is required to be 10 μm or less. By sintering such a fine alumina powder under a reducing nitrogen atmosphere, it can be ensured that the alumina sintered body is excellent in electrical insulation property and chemical resistance while having an increased heat conductivity and infrared ray emissivity. The average particle size of the alumina powder is preferably about 0.6 to 5 μm for further improving these properties of the alumina sintered body. When the particle size of the alumina raw material powder is more than 10 μm, the crystal particle size after sintering increases, so that the density and heat conductivity of the sintered body easily decrease. When the particle size of the alumina powder is less than 0.5 μm, it is difficult to produce an alumina sintered body, and therefore the average particle size of the alumina powder is preferably 0.5 μm or more.

In the present invention, the average particle size of the alumina powder to be used as a raw material is a volume-based D50 particle size measured using a laser diffraction particle size distribution measurement device (FPIA-3000 manufactured by Sysmex Corporation).

In the present invention, it is necessary to perform sintering of the alumina powder under a reducing nitrogen atmosphere. Here, the reducing nitrogen atmosphere means an atmosphere including a gas containing nitrogen components unlike an air atmosphere including an oxygen gas (O$_2$) etc. Specific examples of gases that form the reducing nitrogen atmosphere include nitrogen (N$_2$) and ammonia (NH$_3$). In the present invention, cubic aluminum nitride can be efficiently generated in the alumina sintered body by sintering the alumina powder under a reducing nitrogen atmosphere. The gases that form the reducing nitrogen atmosphere may be used alone, or may be used in combination of two or more thereof. As long as the reductive nitriding reaction of the alumina powder is not hindered, a gas other than the gas containing nitrogen components may be included under the reducing nitrogen atmosphere.

In the present invention, it is preferred to fire a sintering aid together with the alumina powder. Sintering of the alumina sintered body of the present invention can be hereby promoted. The sintering aid is not particularly limited, and a known sintering aid that is used in an alumina sintered body can be used. Examples of the preferred sintering aid include boron compounds, alkali earth metal compounds and rare earth compounds. The sintering aids may be used alone, or may be used in combination of two or more thereof.

Specific examples of the boron compound include oxides such as boric acid, boron oxide (boric anhydride) and aluminum borate. Among them, boric acid and boron oxide (boric anhydride) are more preferred for further improving the heat conductivity of the alumina sintered body.

Specific examples of the alkali earth metal compound include oxides of metals such as magnesium, calcium, strontium and barium, carbonates of these metals, and stearates of these metals. Among them, oxides and carbonates of calcium such as calcium oxide, calcium aluminate and calcium carbonate, calcium stearate and the like are more preferred for further improving the heat conductivity of the alumina sintered body.

Specific examples of the rare earth compound include oxides of metals such as yttrium and lantern, and carbonates of these metals. Among them, yttrium oxide and the like are more preferred for further improving the heat conductivity of the alumina sintered body.

Among these sintering aids, boron compounds and alkali earth metal compounds are preferred, with boron oxide and calcium stearate being especially preferred.

The particle size of the sintering aid is not particularly limited, but is preferably 10 μm or less, more preferably 5 μm or less because the sintering aid becomes more active as its particle size decreases. A sintering aid soluble in water or alcohol, like boron oxide and calcium stearate, may be added to an alumina raw material powder with the sintering aid dissolved in water or alcohol, followed by mixing the mixture using a method such as granulation.

The added amount of the sintering aid is not particularly limited, but is preferably about 0 to 10 parts by mass, more preferably about 0.1 to 5 parts by mass based on 100 parts by mass of the alumina powder. When the added amount of the sintering aid is adjusted to fall within the above-mentioned range, the density and heat conductivity of the obtained alumina sintered body can be further increased. When the added amount of the sintering aid is 5 parts by mass or more, high-heat-conductivity components such as cubic aluminum nitride and aluminum oxynitride generated by the reductive nitriding reaction of the alumina powder easily hinder densification of an alumina sintered body base material. Consequently, the density of the alumina sintered body decreases, so that the heat conductivity easily decreases.

In the present invention, the mixed powder of the alumina powder and the sintering aid is obtained by a known mixing method. The mixing method is, for example, a method in which mixing is performed by a dry process or a wet process using a mixer such as a ball mill. When mixing is performed by a wet process, a dispersion medium such as water, an alcohol or the like is used, but use of an alcohol is desirable from the viewpoint of dispersibility.

In the present invention, it is preferred to fire an organic binder together with the alumina powder. Shape retainability of the alumina sintered body of the present invention can be hereby improved.

The organic binder is not particularly limited, and a known organic binder can be used. Specific examples of the organic binder include acryl resins such as polymethacryl-butyl, polyolefin-based resins such as polystyrene and polypropylene, butyral resins such as polyvinyl butyral, and ethylene-vinyl acetate copolymers. The organic binders may be used alone, or may be used in combination of two or more thereof.

When the organic binder is used, the added amount of the organic binder is not particularly limited, but is preferably about 0.1 to 30 parts by mass, more preferably about 1 to 20 parts by mass based on 100 parts by mass of the alumina powder. When the added amount of the organic binder is less than 0.1 part by mass, it is difficult to obtain an alumina sintered body having a desired shape. When the added amount of the organic binder exceeds 30 parts by mass, an alumina sintered body molded into a desired shape is obtained, but excessive shrinkage may easily occur in the later-described degreasing process, leading to deformation.

In the present invention, a lubricant may be used in addition to the organic binder when an alumina sintered body is molded by a method such as, for example, powder injection molding. Specific examples of the lubricant include oils and fats such as paraffin wax, montanoic acid ester wax and carnauba wax, and fatty acid amides such as stearic acid amide.

When the organic binder is used, the method for mixing the organic binder is not particularly limited. For example, the organic binder may be added and mixed during production of a mixed powder of the alumina powder and the sintering aid. The alumina powder, the sintering aid and the organic binder may be simultaneously added and kneaded using a known powder kneader such as LABO PLASTO-MILL.

When the sintering aid, the organic binder and so on are fired together with the aluminum powder in the present invention, a composition containing these components can be fired together with the aluminum powder to form an alumina sintered body. Further, such a composition containing an alumina powder is molded and then fired to obtain an alumina sintered body molded into a desired shape. The method for molding a composition containing an alumina powder is not particularly limited, and a known method can be used. A known powder molding method such as, for example, powder injection molding, press molding or sheet molding using a doctor blade method can be used.

The firing temperature (maximum firing temperature) in the sintering step is not particularly limited, but is preferably about 1600 to 1825° C., more preferably about 1700 to 1825° C. for ensuring that the aluminum sintered body is excellent in electrical insulation property and chemical resistance while having an increased heat conductivity and infrared ray emissivity. When firing temperature is lower than 1600° C., the reductive nitriding reaction of alumina is hard to proceed, so that an alumina sintered body having a desired high heat conductivity may not be obtained even when firing is performed for a long time. When the firing temperature is higher than 1825° C., alumina having a low heat conductivity and having a spinel structure ($\gamma$-$Al_2O_3$) is excessively generated, so that the heat conductivity of the aluminum sintered body easily decreases.

The firing time in the sintering step is preferably about 0.5 to 10 hours, more preferably about 1 to 5 hours for ensuring that the aluminum sintered body is excellent in electrical insulation property and chemical resistance while having an increased heat conductivity and infrared ray emissivity. From a similar viewpoint, the pressure during sintering is preferably about 0.1 to 2.0 atm. When the firing time is less than 0.5 hours, sintering does not sufficiently proceed, and it is thus difficult to obtain an alumina sintered body having a high heat conductivity. On the other hand, when the firing time exceeds 10 hours, generation of a high-heat-conductivity component by the reductive nitriding reaction of the alumina powder, i.e. improvement of the heat conductivity of the alumina sintered body hits the ceiling.

In the present invention, it is preferred that before the sintering step, a degreasing step of firing a composition containing the alumina powder and the organic binder is carried out at a temperature lower than that in the sintering step. The degreasing step is carried out under the reducing nitrogen atmosphere. It is considered that by the decreasing step, the organic binder added together with the alumina powder is carbonized to generate carbon in the sintered body, and the carbon serves as a catalyst in the reductive nitriding reaction of alumina in the firing step, so that a reaction for generating cubic aluminum nitride in an alumina basic phase is promoted.

The decreasing temperature (maximum temperature) varies depending on a type of organic binder, but is preferably about 250 to 900° C., more preferably 300 to 800° C. for promoting generation of cubic aluminum nitride, aluminum oxynitride or the like. When the decreasing temperature is lower than 250° C., organic binder components easily remain as impurities in the alumina sintered body. When the decreasing temperature is higher than 900° C., excessive shrinkage occurs in the degreasing step, so that the alumina sintered body is easily deformed.

The degreasing time in the degreasing step is not particularly limited as long as degreasing of the organic binder can be caused to sufficiently proceed, but the degreasing time is preferably about 5 to 70 hours, more preferably about 15 to 50 hours.

For example, when the organic binder is fired together with the alumina powder in the present invention, the reductive nitriding reaction of the alumina powder is considered to be promoted by carbon under a nitrogen atmosphere in accordance with the following reaction formula (1):

$$Al_2O_3 + 3C + N_2 \rightarrow 2AlN + 3CO \quad (1)$$

Cubic cAlN is considered to be efficiently generated at the grain boundary or in the grain of the $Al_2O_3$ basic phase owing to the reaction described above. That is, an alumina sintered body having a high heat conductivity is considered to be synthesized by the reductive nitriding reaction between the basic phase alumina surface and nitride using, as a catalyst, carbon generated from the organic binder. This alumina sintered body is considered to have a structure in which very One cubic aluminum nitride particles are dispersed in a matrix of alumina, thereby increasing the heat conductivity of the alumina sintered body.

In the present invention, the reductive nitriding reaction of the alumina powder is considered to be promoted by using a sintering aid. When as the sintering aid, for example, calcium oxide is used, it is considered that by sintering the alumina powder under a nitrogen atmosphere, a reaction is promoted in which a CaO—$Al_2O_3$ intermediate product generated at some midpoint reacts with nitrogen in the presence of carbon to generate cubic aluminum nitride as a high-heat-conductivity component in an alumina basic phase through consecutive reactions as shown in the following chemical reaction formulae (2) to (4):

$$CaO \cdot 2Al_2O_3 + 3C + N_2 \rightarrow CaO \cdot Al_2O_3 + 2AlN + 3CO \quad (2)$$

$$12(CaO \cdot Al_2O_3) + 15C + 5N_2 \rightarrow 12CaO \cdot 7Al_2O_3 + 10AlN + 15CO \quad (3)$$

$$12CaO \cdot 7Al_2O_3 + 21C + 7N_2 \rightarrow 14AlN + 12CaO + 21CO \quad (4)$$

Further, it is considered that as shown in the chemical reaction formula (4), removal of an additive-derived compound such as CaO by thermal decomposition etc. is simultaneously promoted as the reductive nitriding reaction proceeds in firing of the alumina powder, and resultantly an alumina sintered body in which AlN having a high heat conductivity evenly exists in an alumina basic phase is obtained.

The degreasing step and sintering step in the present invention can be carried out by, for example, purging the inside of a tightly sealed furnace with nitrogen, an ammonia gas or the like, placing in the tightly sealed furnace a firing container (setter) formed of a material made of ceramic such as aluminum nitride or boron nitride, and firing an alumina powder (a composition containing an alumina powder) in the setter under a reducing nitrogen atmosphere.

EXAMPLES

The present invention will be described in detail below by showing examples and comparative examples. It is to be noted that the present invention is not limited to examples.

In examples and comparative examples, various kinds of physical properties etc. of the alumina sintered body were measured in the following manner.

Density

A measurement was made at room temperature (25° C.) in accordance with JIS-R1634 using an in-water weighing method.

Heat Conductivity

A measurement was made at room temperature (25° C.) by a laser flash method using "TC-7000" manufactured by ULVAC-RIKO, Inc.

Infrared Ray Emissivity

A measurement was made at room temperature (25° C.) in accordance with JIS-R16932 using a Fourier transform infrared spectrophotometer "FT-IR System 2000" manufactured by PerkinElmer Co., Ltd.

Chemical Resistance Test

Alumina sintered body test pieces (surface area: 5.3 cm²) were immersed in a 6 N aqueous NaOH solution (alkali) at 100° C. and a 1 N aqueous $H_2SO_4$ solution (acid) at 100° C., respectively, for 16 hours, and the resulting mass-decreasing rate of each test piece was measured.

Evaluation of Electrical Insulation Property by Volume Resistivity Measurement

A measurement was made at room temperature (25° C.) in accordance with JIS-K6911 using "HIGHRESTER" manufactured by Mitsubishi Chemical Corporation.

Identification of Crystal Phase of Component Other Than Alumina

X-ray powder diffractometry was performed using an X-ray powder diffractometer "SmartLab" manufactured by Rigaku Corporation. The content (volume percentage) of a phase formed of a component other than alumina was calculated from an intensity ratio of the strongest peak of each phase to the (113) diffraction peak intensity of alumina.

Flexural Strength

A three-point flexural strength was measured at room temperature (25° C.) in accordance with JIS-R1601 using "AUTOGRAPH AG-20kNG" manufactured by Shimadzu Corporation.

Carbon Content

A measurement was made in accordance with JIS-R1675 using an in-solid carbon analyzer "EMIA-110" manufactured by HORIBA, Ltd.

Average Particle Size of Alumina Powder

The average particle size of the alumina powder used as a raw material means a volume-based D50 particle size measured using a laser diffraction particle size distribution measurement device (FPIA-3000 manufactured by Sysmex Corporation).

Examples 1 to 12

To 100 parts by mass of an alumina powder (average particle size: 0.9 μm) were added 7.0 parts by mass of polymethacrylbutyl, 5.0 parts by mass of an ethylene-vinyl acetate copolymer and 6.0 parts by mass of paraffin wax as an organic binder, and the mixture was heated and kneaded at 140° C. by LABO PLASTOMILL to be pelletized. In Examples 6 to 12, 1 part by mass of each of the additives described in Table 1 was added to 100 parts by mass of alumina. Next, the pellet was molded into a circular shape having a thickness of 2.2 mm and a diameter of 15 mm by using an injection molding machine. The obtained molded product was placed in a container made of boron nitride, heated and degreased at maximum 800° C. for 20 hours, and then held for 3 hours with the maximum temperature set to a temperature in Table 1, so that the molded product was sintered. The physical properties of the obtained alumina sintered bodies are shown in Table 1.

Comparative Example 1

An alumina sintered body was obtained in the same manner as in Example 3 except that the molded product was sintered in the air at normal pressure. The physical properties of the obtained alumina sintered bodies are shown in Table 1.

TABLE 1

| | Sintering atmosphere | Additives (parts by mass) | Maximum firing temperature (° C.) | Density (g/cm²) | Heat conductivity (W/mK) | Volume resistivity (Ω cm) | Infrared ray emissivity (dimensionless) | Chemical resistance (decreasing rate) (% by mass) | Components other than alumina (% by volume) | Flexural strength (MPa) | Carbon content (ppm) |
|---|---|---|---|---|---|---|---|---|---|---|---|
| Comparative 1 | Air | None | 1780 | 3.9 | 28 | $>10^{14}$ | 0.58 | Acid < 0.01 Alkali < 0.1 | None | 370 | <100 |
| Example 1 | Nitrogen | None | 1780 | 3.9 | 51 | $>10^{14}$ | 0.82 | Acid < 0.01 Alkali < 0.1 | cAlN (1.1) AlNO (4.3) | 370 | <100 |
| Example 2 | Nitrogen | None | 1800 | 3.9 | 49 | $>10^{14}$ | 0.81 | Acid < 0.01 Alkali < 0.1 | cAlN (1.0) AlNO (5.1) | 380 | <100 |
| Example 3 | Nitrogen | None | 1825 | 3.9 | 41 | $>10^{14}$ | 0.82 | Acid < 0.01 Alkali < 0.1 | cAlN (2.5) AlNO (7.6) | 420 | <100 |

TABLE 1-continued

| | Sintering atmosphere | Additives (parts by mass) | Maximum firing temperature (° C.) | Density (g/cm$^2$) | Heat conductivity (W/mK) | Volume resistivity (Ω cm) | Infrared ray emissivity (dimensionless) | Chemical resistance (decreasing rate) (% by mass) | Components other than alumina (% by volume) | Flexural strength (MPa) | Carbon content (ppm) |
|---|---|---|---|---|---|---|---|---|---|---|---|
| Example 4 | Nitrogen | Yttrium oxide (1) | 1780 | 4 | 48 | >10$^{14}$ | 0.68 | Acid < 0.01 Alkali < 0.1 | cAlN (1.6) AlNO (3.2) YAG (5.1) | 300 | <100 |
| Example 5 | Nitrogen | Yttrium oxide (1) | 1825 | 4 | 45 | >10$^{14}$ | 0.61 | Acid < 0.01 Alkali < 0.1 | cAlN (1.6) γAl$_2$O$_3$ (5.2) AlNO (4.8) YAG (7.1) | 320 | <100 |
| Example 6 | Nitrogen | calcium stearate (1) | 1780 | 3.9 | 72 | >10$^{14}$ | 0.77 | Acid < 0.01 Alkali < 0.1 | cAlN (1.4) AlNO (3.6) | 340 | <100 |
| Example 7 | Nitrogen | calcium stearate (1) | 1700 | 3.9 | 44 | >10$^{14}$ | 0.75 | Acid < 0.01 Alkali < 0.1 | cAlN (0.5) AlNO (3.3) | 340 | <100 |
| Example 8 | Nitrogen | calcium stearate (1) | 1780 | 3.9 | 72 | >10$^{14}$ | 0.77 | Acid < 0.01 Alkali < 0.1 | cAlN (1.4) AlNO (3.6) | 340 | <100 |
| Example 9 | Nitrogen | calcium stearate (1) | 1825 | 3.9 | 59 | >10$^{14}$ | 0.78 | Acid < 0.01 Alkali < 0.1 | cAlN (1.9) γAl$_2$O$_3$ (5.1) AlNO (3.6) | 350 | <100 |
| Example 10 | Nitrogen | Boron oxide (1) | 1700 | 3.9 | 51 | >10$^{14}$ | 0.73 | Acid < 0.01 Alkali < 0.1 | cAlN (0.7) AlNO (1.6) | 350 | <100 |
| Example 11 | Nitrogen | Boron oxide (1) | 1780 | 3.9 | 85 | >10$^{14}$ | 0.78 | Acid < 0.01 Alkali < 0.1 | cAlN (1.2) AlNO (4.1) | 320 | <100 |
| Example 12 | Nitrogen | Boron oxide (1) | 1825 | 3.9 | 63 | >10$^{14}$ | 0.76 | Acid < 0.01 Alkali < 0.1 | cAlN (1.9) γAl$_2$O$_3$ (1.1) AlNO (3.9) | 350 | <100 |

In Table 1, AlNO represents aluminum oxynitride. YAG represents Y$_3$Al$_5$O$_{12}$. cAlN represents cubic (sphalerite type structure) aluminum nitride. γAl$_2$O$_3$ represents alumina of spinet structure.

As shown in Table 1, the alumina sintered bodies of Examples 1 to 12 with sintering performed under a nitrogen atmosphere had a high heat conductivity of 41 to 85 W/m·K. In each of the alumina sintered bodies of Examples 1 to 12, a cubic (sphalerite type structure) aluminum nitride (cAlN) phase considered to contribute to the high heat conductivity of the aluminum sintered body was observed. The alumina sintered bodies of Examples 1 to 12 showed a relatively high infrared ray emissivity of 0.61 to 0.82. Further, the alumina sintered bodies of Examples 1 to 12 was confirmed to have a high volume resistivity and flexural strength and excellent chemical resistance. On the other hand, the alumina sintered body of Comparative Example 1 with sintering performed in the air showed a low heat conductivity of 28 W/m·K, and was significantly inferior in infrared ray emissivity to Example 3 that employed the same maximum sintering temperature. In the alumina sintered body of Comparative Example 1, a cubic (sphalerite type structure) aluminum nitride (cAlN) phase was not observed.

What is claimed is:

1. An alumina sintered body containing cubic aluminum nitride.

2. The alumina sintered body according to claim 1, wherein the heat conductivity is 35 W/m·K or more.

3. The alumina sintered body according to claim 1 or 2, wherein the infrared ray emissivity is 0.60 or more.

* * * * *